United States Patent
Piechowiak et al.

(10) Patent No.: US 12,500,372 B2
(45) Date of Patent: Dec. 16, 2025

(54) NO-CUT UNDERGROUND FLOOD SEAL

(71) Applicant: ABB Schweiz AG, Baden (CH)

(72) Inventors: Chester P. Piechowiak, Daytona Beach, FL (US); Matthew D. Cawood, DeLeon Springs, FL (US)

(73) Assignee: ABB Schweiz AG, Baden (CH)

( * ) Notice: Subject to any disclaimer, the term of this patent is extended or adjusted under 35 U.S.C. 154(b) by 162 days.

(21) Appl. No.: 18/466,281

(22) Filed: Sep. 13, 2023

(65) Prior Publication Data

US 2025/0087935 A1   Mar. 13, 2025

(51) Int. Cl.
*H01R 4/70* (2006.01)
*H01R 13/52* (2006.01)

(52) U.S. Cl.
CPC .......... *H01R 13/5221* (2013.01); *H01R 4/70* (2013.01)

(58) Field of Classification Search
CPC ...... H01R 4/70; H01R 13/52; H01R 13/5221; H01R 13/56; H02G 1/14; H02G 15/02; H02G 15/1826; H02G 15/184; H01B 17/58
USPC ............. 174/74 R–77 R, 78, 84 R–88 R, 93; 29/868, 869, 871; 425/392–393
See application file for complete search history.

(56) References Cited

U.S. PATENT DOCUMENTS

| | | | | |
|---|---|---|---|---|
| 3,528,051 A * | 9/1970 | Cooper | ................... | H01R 4/70 439/523 |
| 4,283,597 A * | 8/1981 | Cooper, Jr. | ............. | H01R 4/70 439/523 |
| 4,506,430 A * | 3/1985 | Guzay, Jr. | ............. | B29C 63/185 174/DIG. 8 |
| 5,221,110 A * | 6/1993 | Hamaue | ............. | B60R 22/1958 297/480 |
| 5,987,745 A * | 11/1999 | Hoglund | ................... | H02G 1/14 29/869 |
| 6,359,226 B1 * | 3/2002 | Biddell | .................... | H01R 4/72 174/74 A |
| 6,782,618 B2 * | 8/2004 | Luzzi | ................... | H02G 15/105 29/748 |
| 7,838,775 B2 * | 11/2010 | Montena | ........... | H01R 13/5213 439/523 |
| 8,502,076 B2 * | 8/2013 | Luzzi | ...................... | H01R 4/72 174/93 |
| 9,184,576 B2 * | 11/2015 | Vallauri | ............. | H02G 15/1826 |

* cited by examiner

Primary Examiner — William H. Mayo, III
(74) Attorney, Agent, or Firm — Leydig, Voit & Mayer, Ltd.

(57) ABSTRACT

A sealing system includes: at least one sheath having a sheath cable entrance, a sheath cable exit, and a sheath cable passage extending from the sheath cable entrance to the sheath cable exit. A first sheath section has a first sheath section diameter. A second sheath section has a second sheath section diameter. The second sheath section diameter is larger than the first sheath section diameter. The sealing system also includes a cable insertion guide insertable into the sheath cable passage. The cable insertion guide has a first guide section with a first guide section diameter. The first guide section diameter is larger than the first sheath section diameter. Insertion of the cable insertion guide into the sheath cable passage so as to dispose the first guide section within the first sheath section enlarges the first sheath section diameter.

14 Claims, 8 Drawing Sheets

NO-CUT UNDERGROUND FLOOD SEAL

FIELD

The present disclosure generally relates to sealing sheaths for cables, such as underground power distribution cables.

BACKGROUND

Various sealing sheaths and methods for sealing cables (e.g., to prevent the ingress of water or other contaminants) are known in the prior art, such as what is described in U.S. Pat. No. 3,528,051. The sheaths described therein can be cut in order to accommodate different gauge cables. Specifically, each sheath includes at one end thereof a plurality of sequentially decreasing external diameters, each of which is marked with a gradation corresponding to a specific gauge of cable that the sheath will be used to seal. As the external diameter of the sheath decreases, so does the internal diameter of the cable passage within the sheath. It is then incumbent on the installer of the sheath to use a tool, such as a knife, to cut the sheath at the appropriate gradation for the subject cable, namely a gradation resulting in the smallest internal diameter of the sheath being approximately the same, or slightly smaller than, the diameter of the cable. The cable can then be inserted through the sheath in order to seal the cable.

Since such sheaths require the involvement of the installer, various problems often result. For example, the installer can mistakenly cut themselves when attempting to cut the sheath. The sheath can be cut at the wrong gradation, resulting in an ineffective seal. The sheath can also be cut an angle or otherwise not properly cut, which can also result in an ineffective seal. Such problems result in the sheaths of the prior art not always being the most effective way to seal cables of different diameters. As such, an installer of these sheaths must build skill over time in order to provide effective seals. When attempting to seal such cables, there is therefore a need to overcome the problems of the prior art.

SUMMARY

In an embodiment, the present invention provides a sealing system, comprising: at least one sheath, comprising: a sheath cable entrance, a sheath cable exit, a sheath cable passage extending from the sheath cable entrance to the sheath cable exit, a first sheath section having a first sheath section diameter, and a second sheath section having a second sheath section diameter, the second sheath section diameter being larger than the first sheath section diameter, and a cable insertion guide insertable into the sheath cable passage, the cable insertion guide having a first guide section with a first guide section diameter, wherein the first guide section diameter is larger than the first sheath section diameter, and wherein insertion of the cable insertion guide into the sheath cable passage so as to dispose the first guide section within the first sheath section enlarges the first sheath section diameter.

DETAILED DESCRIPTION

To overcome the problems associated with the prior art, the present application describes sealing systems, cable insertion guides, and methods for sealing a cable. The sealing systems, cable insertion guides, and methods described herein can be used as a direct replacement for prior art sealing solutions, including being used to seal a wide range of cable gauges. Moreover, the sealing systems, cable insertion guides, and methods described herein do not require cutting. Nor do they require a high level of skill in order to implement, which lowers the likelihood of forming ineffective seals. At the same time, the sealing systems, cable insertion guides, and methods described herein allow for the effective sealing of one or more cables.

Figures 1A, 1B:
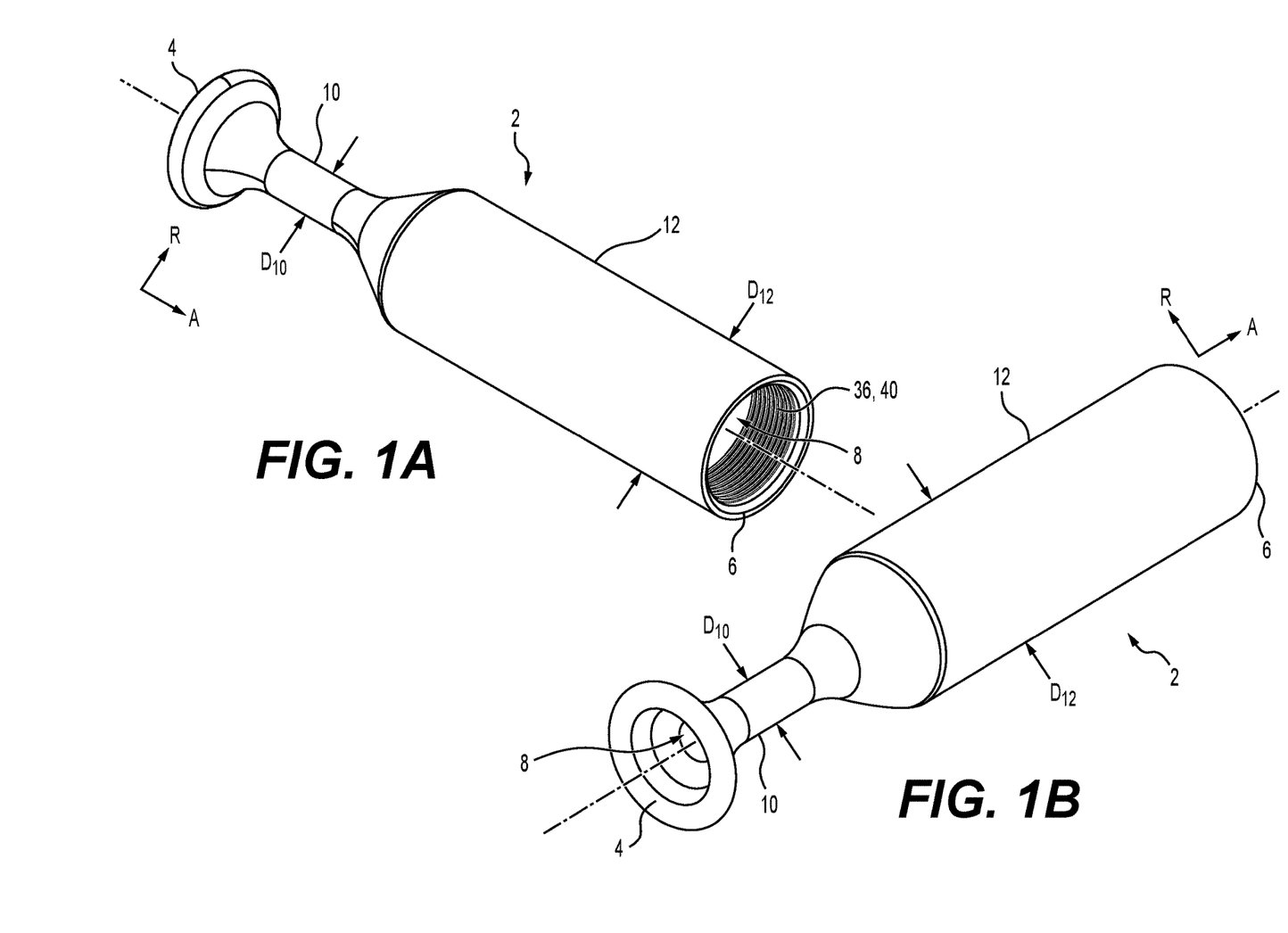
FIGS. 1A-1D show various views of a female sheath according to the present disclosure.
Figures 1C, 1D:
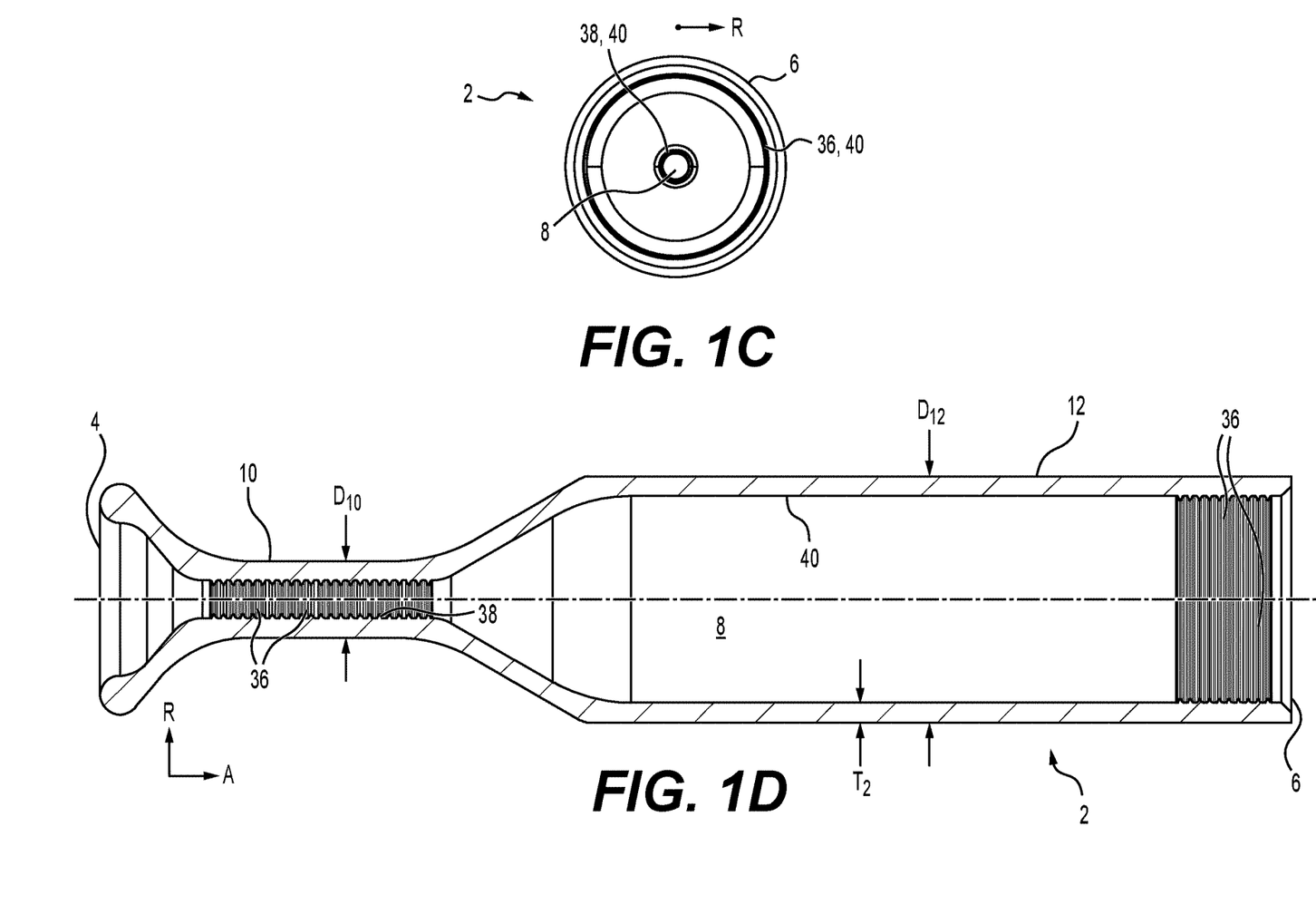
Figures 3A, 3B, 3C, 3D:
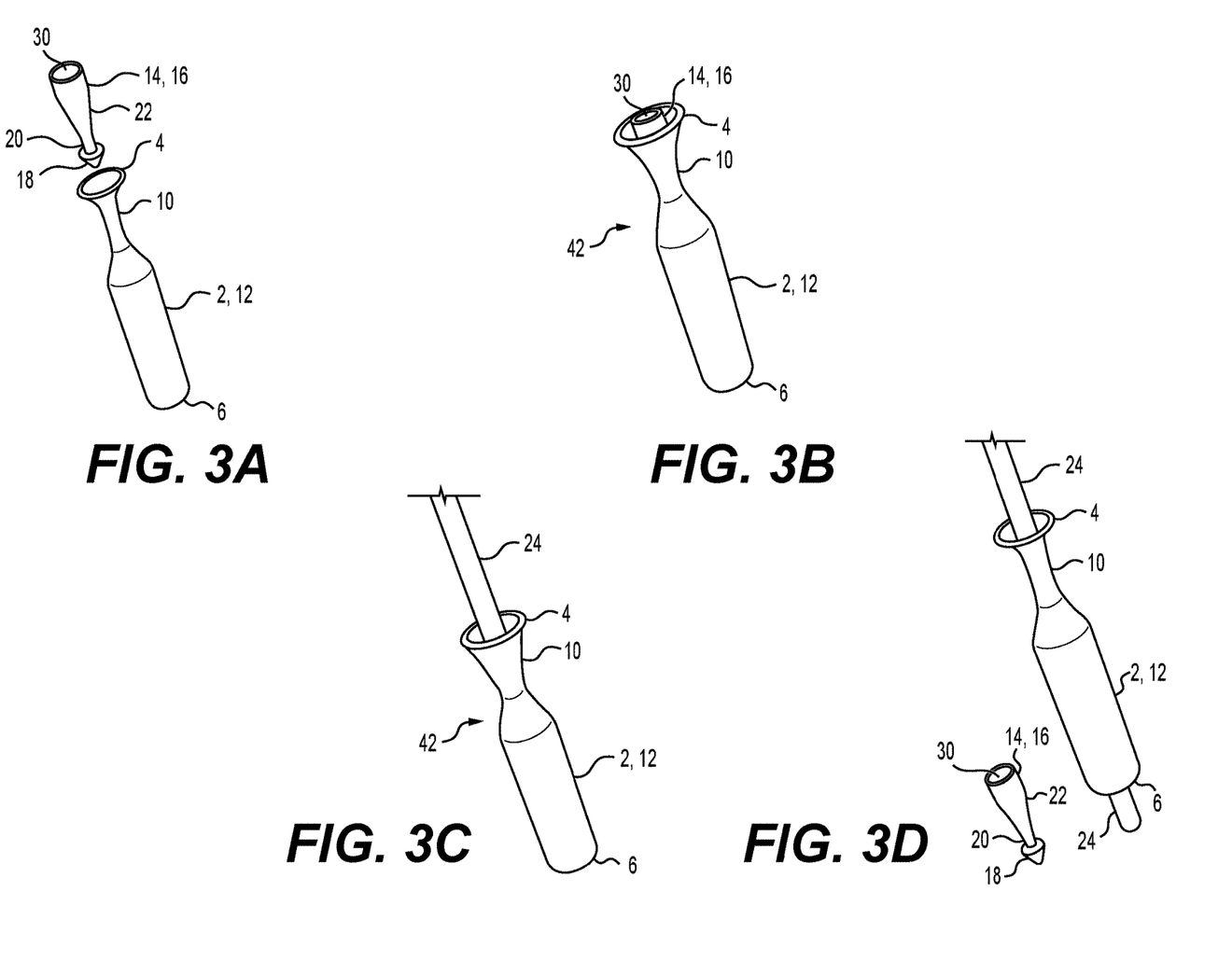
FIGS. 3A-3D show a method of sealing a cable and providing a sealing system using the female sheath of FIGS. 1A-1D and the cable insertion guide of FIGS. 2A-2D.
Figures 4A, 4B:
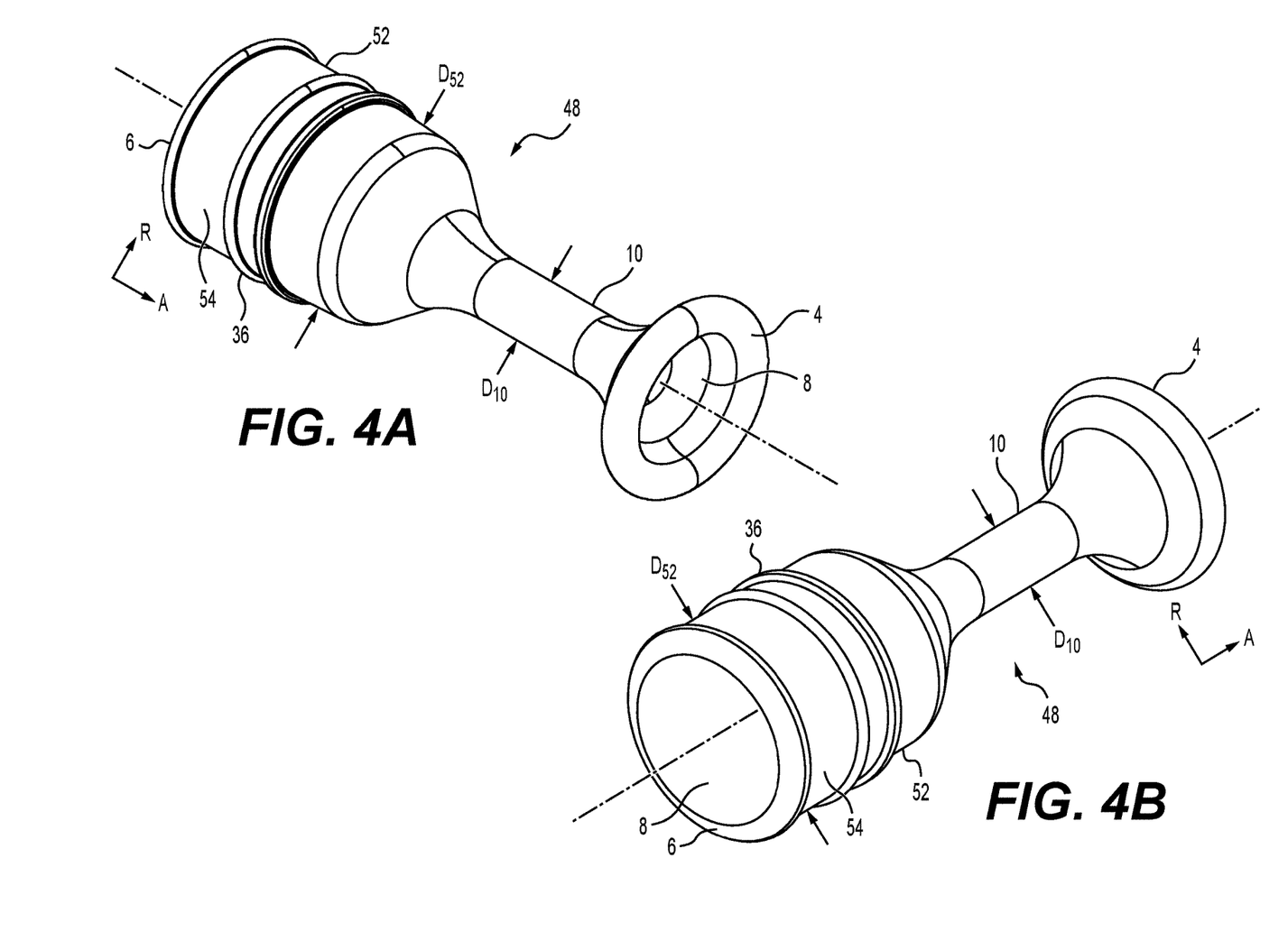
FIGS. 4A-4D show various views of a male sheath according to the present disclosure.
Figure 4C:
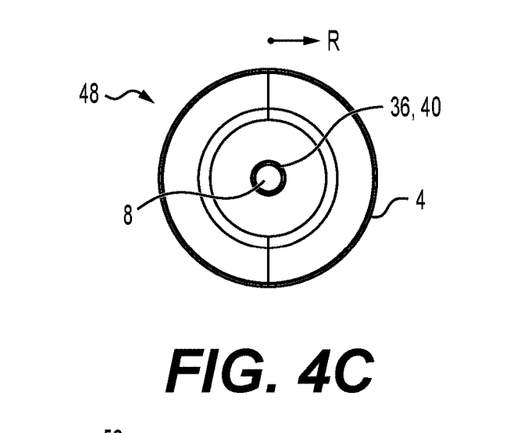
Figure 4D:
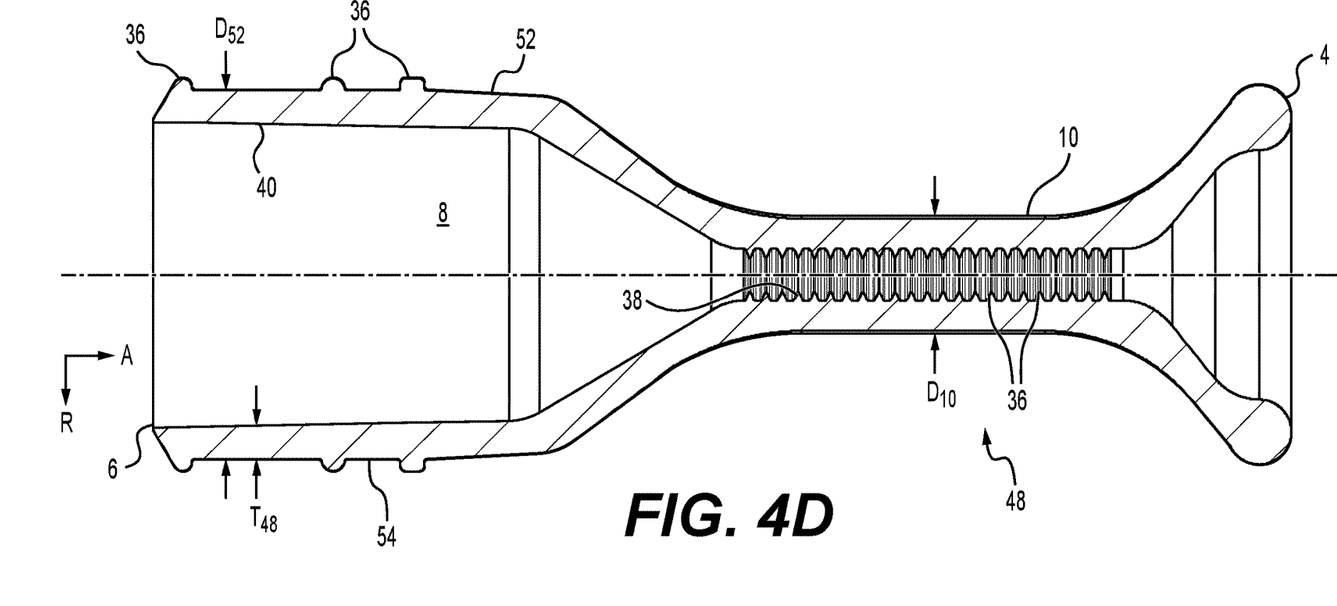
Figure 5:
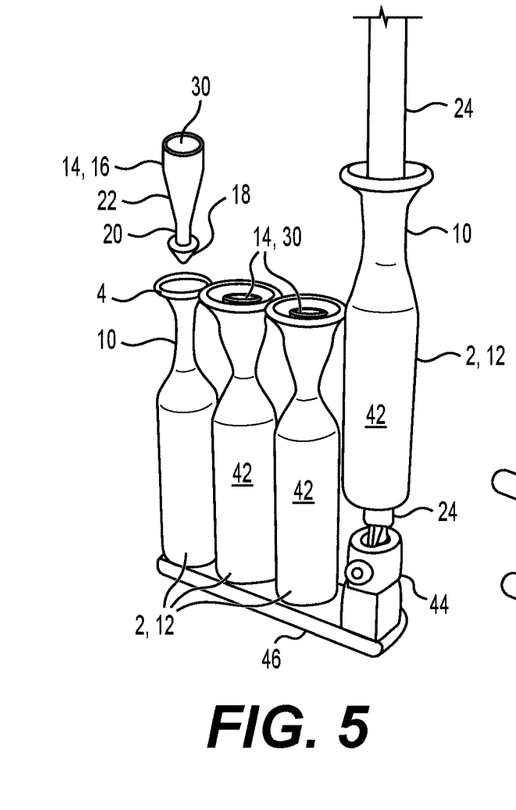
FIG. 5 shows an arrangement of a plurality of the female sheath of FIGS. 1A-ID and a plurality of the cable insertion guide of FIGS. 2A-2D.

FIGS. 1A-ID show an embodiment of a female sheath 2 to be used in accordance with the present disclosure. Female sheath 2 has a generally cylindrical shape that extends along axial direction A. Female sheath 2 has a sheath cable entrance 4, through which a cable to be sealed (e.g., cable 24, as shown in FIGS. 3C-3D) is insertable. It is possible that female sheath 2 has more than one sheath cable entrance 4, for example, if it is desired to seal more than one cable. For simplicity, however, the discussion herein focuses on a single sheath cable entrance 4. Female sheath 2 also has a sheath cable exit 6 arranged axially opposite sheath cable entrance 4. The cable to be sealed exits female sheath 2 at sheath cable exit 6. A sheath cable passage 8 extends from sheath cable entrance 4 to sheath cable exit 6, along axial direction A. Sheath cable passage 8 generally provides space within female sheath 2 for both the cable and a cable insertion guide (as discussed in more detail below) to pass. Sheath cable passage 8 is disposed radially inward (i.e., in radial direction R) from an outer surface of female sheath 2. Female sheath 2 has a nominal thickness $T_2$, which can be varied. Female sheath 2 is made of a stretchable material such as rubber or ethylene propylene diene monomer ("EPDM"). As such, female sheath 2 can be stretched (e.g., so as to fit around a cable), but will also contract after being stretched, which helps female sheath 2 to form a seal around a cable inserted therein.

Female sheath 2 includes a first sheath section 10 and a second sheath section 12, both of which are also generally cylindrical in shape. First sheath section 10 has a first sheath section diameter $D_{10}$, while second sheath section 12 has a second sheath section diameter $D_{12}$. Second sheath section diameter $D_i$ is larger than first sheath section diameter $D_{10}$. Given that female sheath 2 is made of a stretchable material, first sheath section diameter $D_{10}$ and second sheath section diameter $D_{ix}$ can change (e.g., due to the stretching or contraction of female sheath 2). In general, however, first sheath section diameter $D_{10}$ is sized such that the portion of sheath cable passage 8 within first sheath section 10 has a diameter that is smaller than a diameter of a cable to be sealed by female sheath 2. This difference in diameters facilitates an effective seal between the cable and female sheath 2 within first sheath section 10, particularly due to the stretchiness of female sheath 2.

To further improve the seal provided by female sheath 2 (i.e., with respect to a cable inserted therein), first sheath section 10 includes a plurality of sealing ribs 36 on a radially inward side 38 of first sheath section 10. In the embodiment shown, sealing ribs 36 are sinusoidally shaped. In addition, second sheath section 12 can also include a plurality of sealing ribs 36 on a radially inward side 40 of second sheath section 12. These sealing ribs 36 can also be sinusoidally shaped. Sealing ribs 36 on radially inward side 40 of second sheath section 12 help facilitate sealing between female sheath 2 and another (e.g., male) sheath inserted into female sheath 2 (as discussed in more detail below).

FIGS. 2A-2D show an embodiment of a cable insertion guide 14 to be used in accordance with the present disclosure. Cable insertion guide 14 is also generally cylindrically shaped, like female sheath 2, and extends along axial direction A. Cable insertion guide 14 has a first guide section 16 and a second guide section 20. First guide section 16 has a first guide section diameter $D_{16}$, while second guide section 20 has second guide section diameter $D_{20}$. As shown in the figures, second guide section diameter $D_{20}$ is smaller than first guide section diameter $D_{16}$. Cable insertion guide 14 also includes a sheath insertion portion 18, which facilitates insertion of cable insertion guide 14 into a sheath, such as female sheath 2. Second guide section 20 is axially disposed (i.e., along axial direction A) between first guide section 16 and sheath insertion portion 18. In this manner, sheath insertion portion 18 is disposed at a first end 26 of cable insertion guide 14, while first guide section 16 is disposed at a second end 28 of cable insertion guide 14, second end 28 being opposite first end 26 in axial direction A.

Cable insertion guide 14 has a guide transition section 22 extending axially between (i.e., along axial direction A) first guide section 16 and second guide section 20 so as to transition first guide section diameter $D_{16}$ to second guide section diameter $D_{20}$.

Figures 2A, 2B:
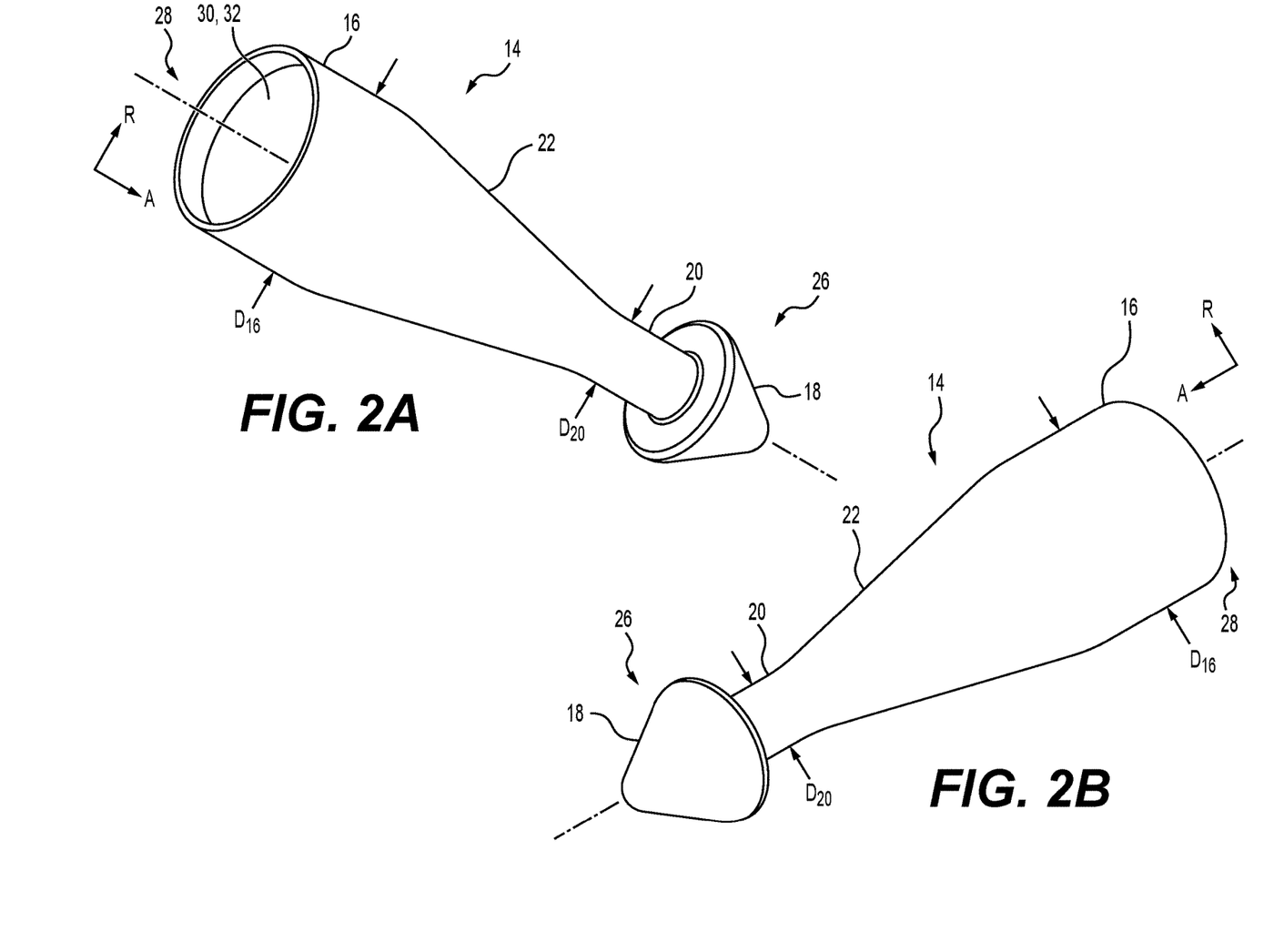
FIGS. 2A-2D show various views of a cable insertion guide according to the present disclosure.
Figure 2C:
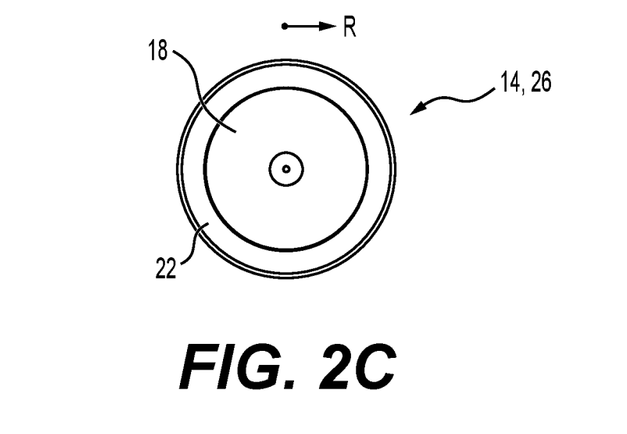
Figure 2D:
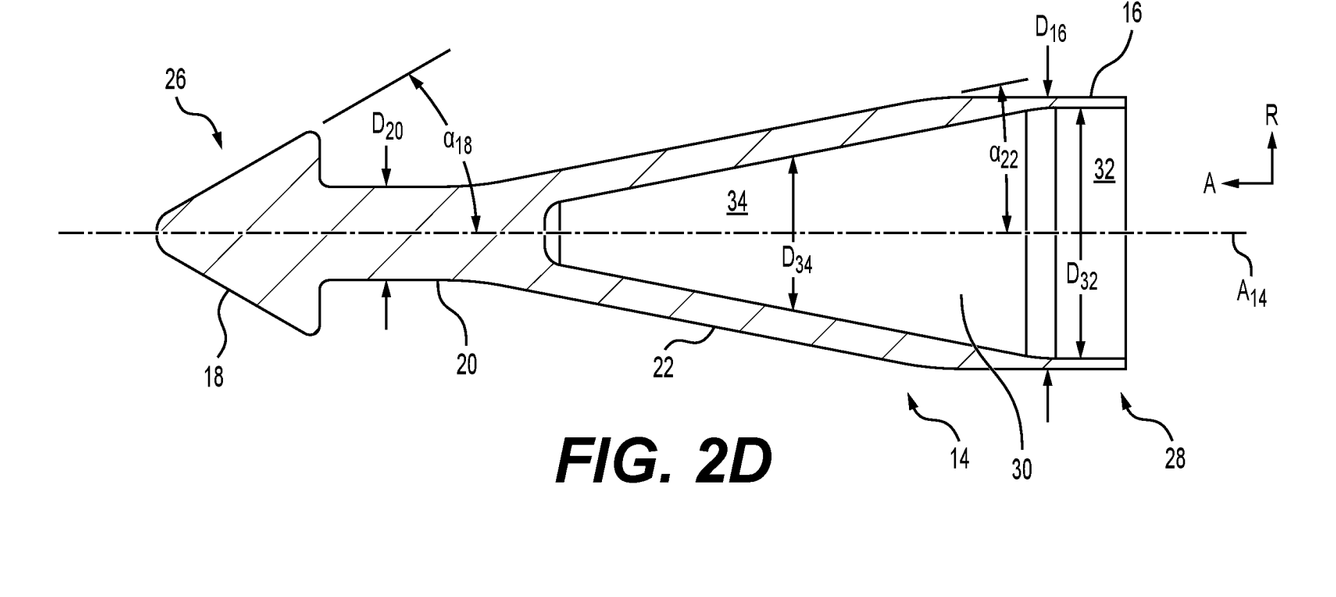

Sheath insertion portion 18 can have a cone shape, for example. In this configuration, sheath insertion portion 18 has a sheath insertion portion angle $\alpha_{18}$ with respect to an axis $A_{14}$ of cable insertion guide 14 (which axis $A_{14}$ extends in axial direction A), as shown in FIG. 2D. Moreover, guide transition section 22 has a guide transition section angle $\alpha_{22}$ with respect to axis $A_{14}$. Sheath insertion portion angle $\alpha_{18}$ can be greater than guide transition section angle $\alpha_{22}$. For example, sheath insertion portion angle $\alpha_{18}$ could be 30°, while guide transition section angle $\alpha_{22}$ could be 11°. As such, upon insertion of cable insertion guide 14 into a sheath (e.g., at sheath cable entrance 4 of female sheath 2), sheath insertion portion angle $\alpha_{18}$ can allow sheath insertion portion 18 to widen or stretch the sheath, facilitating passage of cable insertion guide 14 through the sheath (e.g., through sheath cable passage 8 of female sheath 2).

Cable insertion guide 14 includes a cable receiving area 30 disposed radially inward (i.e., with respect to radial axis R) of at least first guide section 16 so as to receive therein a cable to be sealed. Cable receiving area 30 can also be disposed axially inward (i.e., along axial direction A) of second end 28 of cable insertion guide 14. As shown in FIG. 2D, cable receiving area 30 generally extends between first guide section 16 and guide transition section 22. Cable receiving area 30 comprises at least a first cable receiving area section 32 disposed radially inward of first guide section 16 and a second cable receiving area section 34 disposed radially inward of at least part of guide transition section 22. In this sense, the presence of cable receiving area 30 results in cable insertion guide 14 being at least partially hollow.

First cable receiving area section 32 and second cable receiving area section 34 have different diameters with respect to axis $A_{14}$. In particular, first cable receiving area section 32 has a first cable receiving area section diameter $D_{32}$ and second cable receiving area section 34 has a second cable receiving area section diameter $D_{34}$. First cable receiving area diameter $D_{32}$ is larger than the second cable receiving area diameter $D_{34}$, which results in cable receiving area 30 becoming smaller while progressing from first cable receiving area section 32 to second cable receiving area section 34 along axial direction A.

Moreover, second cable receiving area section diameter $D_{34}$ may vary. In an embodiment, second cable receiving area section diameter $D_{34}$ becomes smaller when traveling away from first cable receiving area section 32 on axis $A_{14}$ (i.e., toward sheath insertion portion 18). The decreasing size of second cable receiving area section diameter $D_{34}$ allows cable receiving area 30 to snugly accommodate the ends of cables of different diameters. For example, if the cable inserted into cable receiving area 30 is of a larger diameter, it may contact cable insertion guide 14 right at the beginning of second cable receiving area section 34 (i.e., immediately after passing through first cable receiving area section 32 in axial direction A). However, if the cable inserted into cable receiving area 30 is of a smaller diameter, it may pass farther into second cable receiving area section 34 and not contact cable insertion guide 14 until passing, for example, half way through second cable receiving area section 34 when traveling in axial direction A. Contact between the cable and cable insertion guide 14 (i.e., within cable receiving area 30) can cause movement of cable insertion guide 14 (e.g., with respect to a sheath, such as female sheath 2, into which cable insertion guide 14 is inserted) along axial direction A.

Female sheath 2 and cable insertion guide 14 can be used together to provide a sealing system for effectively sealing a cable. In particular, first guide section diameter $D_{16}$ of cable insertion guide 14 is larger than first sheath section diameter $D_{10}$ of female sheath 2. This diameter relationship allows for an interference fit between female sheath 2 and cable insertion guide 14 when cable insertion guide 14 is inserted into female sheath 2.

This method of sealing a cable is shown in connection with FIGS. 3A-3D. Specifically, as shown in FIG. 3A, cable insertion guide 14 is inserted through sheath cable entrance 4 of female sheath 2 and into sheath cable passage 8. Continued insertion of cable insertion guide 14 disposes first guide section 16 within first sheath section 10 of female sheath 2, enlarging first sheath section diameter $D_{10}$ of first sheath section 10, as shown in FIG. 3B. Female sheath 2 enlarges in part due to the stretchable nature of the material of female sheath 2. This means that first sheath section diameter $D_{10}$ increases from its normal extent (i.e., when female sheath 2 is not stretched at all) to some larger size upon sufficient insertion of cable insertion guide 14 into female sheath 2. This configuration of female sheath 2 and cable insertion guide 14 (i.e., where cable insertion guide 14 enlarges first sheath section 10) is referred to as a sealing system 42.

Once sealing system 42 is prepared, as shown in FIG. 3B, the tolerance fit between cable insertion guide 14 and first sheath section 10 is sufficient on its own to provide a sealing effect, even before any cable is inserted into sealing system 42. For this reason, sealing system 42 in the configuration shown in FIG. 3B can be shipped to customers, then mounted on, for example, one port 44 of a multi-port connector 46, as shown on the left side of FIG. 6. Sealing system 42 can then be used to provide a seal (e.g., on port 44) without any cable being inserted into sealing system 42 (i.e., if port 44 is unused). Alternatively, female sheath 2 and cable insertion guide 14 can be shipped to customers as separate components, leaving an installer to insert cable insertion guide 14 into female sheath 2 in order to form sealing system 42.

Returning to FIG. 3C, if it is desired to seal a cable 24 using sealing system 42, an installer can place cable 24 into contact with cable insertion guide 14, namely at cable receiving area 30. Once contact is made, the installer can continue to push cable 24 through sheath cable entrance 4 and into sheath cable passage 8. Specifically, the installer can hold female sheath 2 in one hand while continuing to push cable 24 into cable insertion guide 14 using the other hand, which results in cable insertion guide 14 continuing to pass through sheath cable passage 8 of female sheath 2. Moreover, since cable insertion guide 14 has already enlarged first sheath section diameter $D_{10}$ of first sheath section 10 of female sheath 2, cable 24 can pass into and through sheath cable passage 8 even if the diameter of cable 24 is larger than first sheath section diameter $D_{10}$ when female sheath 2 is not stretched. This diameter relationship allows for an interference fit between female sheath 2 and cable 24, which is facilitated by cable insertion guide 14's insertion into female sheath 2.

If the installer continues push cable 24 with respect to female sheath 2, cable 24 will be pushed through sheath cable passage 8 and out of sheath cable exit 6 of female sheath 2. As shown in FIG. 3D, this continued pushing can result in ejecting cable insertion guide 14 from female sheath 2. If desired, cable insertion guide 14 can then be discarded. Following this method results in female sheath 2 sealing cable 24, all without the difficulties of prior art solutions.

Figure 6:
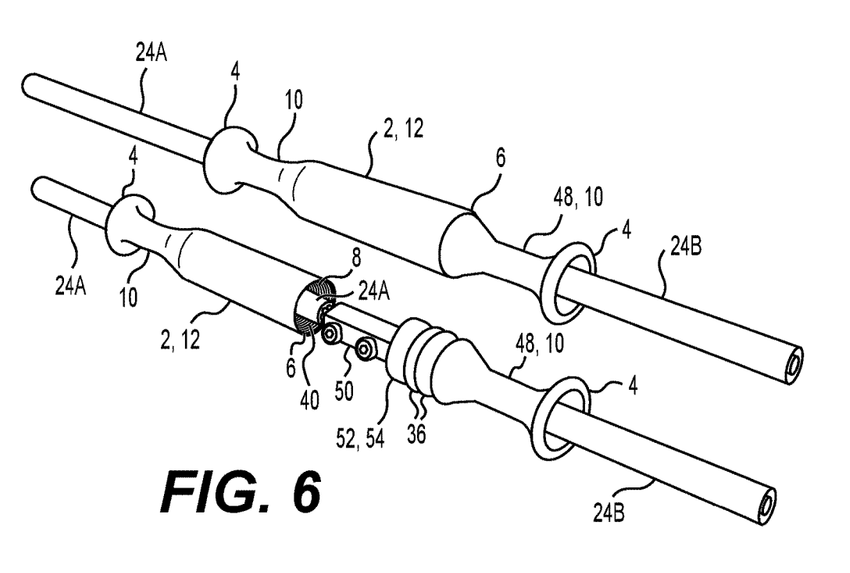
FIG. 6 shows the splicing of two cables using the female sheath of FIGS. 1A-ID and the male sheath of FIGS. 4A-4D.

FIGS. 4A-4D show another sheath, in this embodiment male sheath 48, that can be used together with female sheath 2 to, for example, form a seal over a splice 50 of two cables 24A, 24B, as shown in FIG. 6. Male sheath 48 is generally similar to female sheath 2. As such, like reference characters will be used to refer to like components, and the discussion of those components in the context of female sheath 2 is the same as the discussion of those components in the context if male sheath 48. As one example, cable insertion guide 14 can be inserted into sheath cable entrance 4 of male sheath 48 so as to enlarge first sheath section diameter $D_{10}$ of first sheath section 10 of male sheath 48, facilitating insertion of a cable (e.g., cable 24B, as shown in FIG. 6) into male sheath 48 for sealing by male sheath 48.

Where male sheath 48 differs from female sheath 2 is that second sheath section 52 of male sheath 48 has a smaller second sheath section diameter $D_{52}$ than second sheath section diameter $D_{12}$ of second sheath section 12 of female sheath 2. Specifically, after taking into consideration thickness $T_2$ of female sheath 2, second sheath section 52 of male sheath 48 can be inserted into sheath cable exit 6 of female sheath 2 so as to form a seal between second sheath section 52 of male sheath 48 and female sheath 2 at sheath cable exit 6 of female sheath 2. It is for this reason that second sheath section 12 of female sheath 2 can include plurality of sealing ribs 36 on radially inward side 40 of second sheath section 12, as discussed above, which can facilitate sealing between second sheath section 12 of female sheath 2 and second sheath section 52 of male sheath 48. Similarly, second sheath section 52 of male sheath 48 can include its own plurality of sealing ribs 36 on a radially outward side 54 of second sheath section 52.

Once female sheath 2 is used to seal cable 24A and male sheath 48 is used to seal cable 24B, cables 24A, 24B can be spliced at splice 50, as shown in the lower portion of FIG. 6. To then seal splice 50, second sheath section 52 of male sheath 48 can be inserted into sheath cable exit 6 of female sheath 2, such that radially outward side 54 of second sheath section 52 of male sheath 48 contacts radially inward side 40 of second sheath section 12 of female sheath 2, making a seal over splice 50. If sealing ribs 36 are included on radially outward side 54 of second sheath section 52 of male sheath 48 and/or radially inward side 40 of second sheath section 12, sealing ribs 36 will further facilitate the sealing of splice 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 2 female sheath
4 sheath cable entrance
6 sheath cable exit
8 sheath cable passage
10 first sheath section
12 second sheath section of female sheath 2
14 cable insertion guide
16 first guide section
18 sheath insertion portion
20 second guide section
22 guide transition section
24, 24A, 24B cable
26 first end of the cable insertion guide
28 second end of the cable insertion guide
30 cable receiving area
32 first cable receiving area section
34 second cable receiving area section
36 sealing ribs
38 radially inward side of first sheath section 40 radially inward side of second sheath section
42 sealing system
44 port
46 multi-port connector
48 male sheath
50 splice
52 second sheath section of male sheath 48
54 radially outward side of second sheath section 52
A axial direction
$A_{14}$ axis of the cable insertion guide
$\alpha_{18}$ sheath insertion portion angle
$\alpha_{22}$ guide transition section angle
$D_{10}$ first sheath section diameter
$D_{12}$ second sheath section diameter
$D_{16}$ first guide section diameter
$D_{20}$ second guide section diameter
$D_{32}$ first cable receiving area section diameter
$D_{34}$ second cable receiving area section diameter
$D_{52}$ second sheath section diameter
R radial direction
$T_2$ thickness of female sheath
$T_{48}$ thickness of male sheath

What is claimed is:

1. A sealing system, comprising:
at least one sheath, comprising:
a sheath cable entrance,
a sheath cable exit,
a sheath cable passage extending from the sheath cable entrance to the sheath cable exit,
a first sheath section having a first sheath section diameter, and
a second sheath section having a second sheath section diameter, the second sheath section diameter being larger than the first sheath section diameter; and
a cable insertion guide insertable into the sheath cable passage, the cable insertion guide having a first guide section with a first guide section diameter,
wherein the first guide section diameter is larger than the first sheath section diameter,
wherein insertion of the cable insertion guide into the sheath cable passage so as to dispose the first guide section within the first sheath section enlarges the first sheath section diameter,
wherein the cable insertion guide comprises a cable receiving area disposed radially inward of at least the first guide section,
wherein the cable receiving area extends between the first guide section and the guide transition section, the cable receiving area comprising a first cable receiving area section disposed radially inward of the first guide section and a second cable receiving area section disposed radially inward of at least part of the guide transition section,
wherein the first cable receiving area section has a first cable receiving area section diameter and the second cable receiving area section has a second cable receiving area section diameter, and
wherein the first cable receiving area diameter is larger than the second cable receiving area diameter.

2. The sealing system of claim 1, wherein the cable insertion guide comprises:
a sheath insertion portion; and
a second guide section having a second guide section diameter, the second guide section diameter being smaller than the first guide section diameter,
wherein the second guide section is axially disposed between the first guide section and the sheath insertion portion.

3. The sealing system of claim 2, wherein the cable insertion guide comprises:
a guide transition section extending axially between the first guide section and the second guide section so as to transition the first guide section diameter to the second guide section diameter.

4. The sealing system of claim 3, wherein the sheath insertion portion has a cone shape.

5. The sealing system of claim 4, wherein the sheath insertion portion has a sheath insertion portion angle with respect to an axis of the cable insertion guide and the guide transition section has a guide transition section angle with respect to the axis, and
wherein the sheath insertion portion angle is greater than the guide transition section angle.

6. The sealing system of claim 1, wherein the first sheath section includes a plurality of sealing ribs on a radially inward side of the first sheath section.

7. The sealing system of claim 1, wherein the second sheath section includes a plurality of sealing ribs on a radially inward side of the second sheath section.

8. A cable insertion guide for a sheath for a cable, comprising:
a sheath insertion portion disposed at a first end of the cable insertion guide;
a first guide section disposed at a second end of the cable insertion guide, the second end being opposite the first end in an axial direction, the first guide section having a first guide section diameter;
a second guide section axially disposed between the sheath insertion portion and the first guide section, the second guide section having a second guide section diameter, the second guide section diameter being smaller than the first guide section diameter;
a guide transition section extending axially between the first guide section and the second guide section so as to transition the first guide section diameter to the second guide section diameter; and
a cable receiving area disposed radially inward of at least the first guide section, the cable receiving area extending between the first guide section and the guide transition section, the cable receiving area comprising a first cable receiving area section disposed radially inward of the first guide section and a second cable receiving area section disposed radially inward of at least part of the guide transition section,
wherein the first cable receiving area section has a first cable receiving area section diameter and the second cable receiving area section has a second cable receiving area section diameter, and
wherein the first cable receiving area diameter is larger than the second cable receiving area diameter.

9. The cable insertion guide of claim 8, wherein the cable receiving area is disposed axially inward of the second end of the cable insertion guide.

10. The cable insertion guide of claim 8, wherein the sheath insertion portion has a cone shape.

11. The cable insertion guide of claim 10, wherein the sheath insertion portion has a sheath insertion portion angle with respect to an axis of the cable insertion guide and the guide transition section has a guide transition section angle with respect to the axis, and
wherein the sheath insertion portion angle is greater than the guide transition section angle.

12. A method of sealing at least one cable, comprising:
- providing at least one sheath, the at least one sheath comprising a sheath cable entrance, a sheath cable exit, a sheath cable passage extending from the sheath cable entrance to the sheath cable exit, and a first sheath section having a first sheath section diameter;
- providing a cable insertion guide having a cable receiving area and a first guide section having a first guide section diameter, the first guide section diameter being larger than the first sheath section diameter;
- inserting the cable insertion guide into the at least one sheath so as to dispose the first guide section within the first sheath section and enlarge the first sheath section diameter;
- placing the at least one cable into contact with the cable receiving area; and
- pushing the at least one cable through the sheath cable entrance and into the sheath cable passage,
- wherein the cable insertion guide comprises a cable receiving area disposed radially inward of at least the first guide section,
- wherein the cable receiving area extends between the first guide section and the guide transition section, the cable receiving area comprising a first cable receiving area section disposed radially inward of the first guide section and a second cable receiving area section disposed radially inward of at least part of the guide transition section,
- wherein the first cable receiving area section has a first cable receiving area section diameter and the second cable receiving area section has a second cable receiving area section diameter, and
- wherein the first cable receiving area diameter is larger than the second cable receiving area diameter.

13. The method of claim 12, further comprising:
- pushing the cable through the sheath cable passage and out of the sheath cable exit.

14. The method of claim 13, wherein pushing the cable through the sheath cable passage and out of the sheath cable exit ejects the cable insertion guide from the at least one sheath.

* * * * *